W. G. LEATHERS.
POWER GENERATION.
APPLICATION FILED MAY 8, 1917.

1,349,969. Patented Aug. 17, 1920.

Witnesses

Inventor
Ward G. Leathers

UNITED STATES PATENT OFFICE.

WARD G. LEATHERS, OF HAWORTH, NEW JERSEY, ASSIGNOR TO SUBMARINE ARMS CORPORATION, OF NEW YORK, N. Y.

POWER GENERATION.

1,349,969.  Specification of Letters Patent.  Patented Aug. 17, 1920.

Application filed May 8, 1917. Serial No. 167,309.

*To all whom it may concern:*

Be it known that I, WARD G. LEATHERS, a citizen of the United States, residing at Haworth, in the county of Bergen and State of New Jersey, have invented certain new and useful Improvements in Power Generation, of which the following is a specification, reference being had therein to the accompanying drawing.

My invention relates to the generation of power by means of a heat producer which contains its own oxygen and which gives off little or no gaseous products of combustion.

The purpose of my invention is to produce a form of power which does not require the utilization of air or free oxygen to support combustion. Such a power is highly advantageous for use under water where atmospheric air or oxygen would ordinarily have to be provided in compressed form. In order to obtain such power I utilize one of those chemical compounds such as aluminum and oxid of iron or any of the other compounds which furnish similar heat reactions such as the one commercially known as thermit and convert the heat energy of this reaction into power by expanding a liquid or gas such as water, $CO_2$, $CS_2$ or other gas. In a preferred form and for one of the many important uses I produce power for submarine craft such as submarines and torpedoes by converting this heat into steam pressure by the use of fresh water or sea water.

A further purpose of my invention is to so insulate the extreme temperatures of such reactions that although the entire charge of heat producing compound may reach its maximum temperature almost immediately after ignition the utilization of the thermal content may be stretched over a considerable period of time and the power obtained from same be produced of even or uneven values as desired.

A further purpose of my invention is to so harness the terrific temperatures of these heat reactions that they may be utilized in the form of flexible power, and so controlled that a large economy in thermal efficiency may be obtained in said power.

My invention makes it possible to inclose the aforesaid heat producing compounds, ignite them, and then draw off the amount of heat desired. It also makes it possible to generate steam at an automatically regulated and predetermined pressure. It makes it possible to increase or decrease that automatically regulated pressure and it also makes it possible to obtain almost any desired pressure almost instantly.

In the following specification I have outlined a few of the principal features of my invention and it will be noted on reading it in conjunction with the drawings submitted herewith that those skilled in this art may provide a multitude of variations in the combination and arrangement of these ideas and structures without departing from the spirit of my invention.

Figure 1:
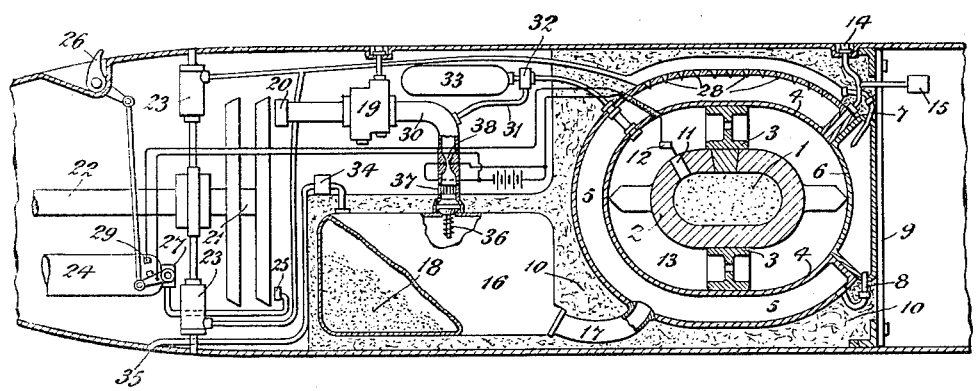
Figure 1 is a longitudinal cross section of a submersible craft of torpedo proportions.

In Fig. 1, 1 is a quantity of heat producing compound incased in a container 2. This container is made of material which will withstand the very great heats of the heat producing compound. It may be made much as crucibles are made or of carborundum and quartz baked together or by any other of the methods known to the art of handling high temperatures. The container 2 may be held on a support 3 made of heat-resisting material or it may be packed in sufficient lime or other heat resisting substance to properly separate it from the wall 4 of the steam chamber 5. At 6 I have provided a door through which the container 2 may be passed. This door may be hollow and filled with vacuum or gas, or indeed steam may be generated in it also by by-passing water through a jet 7 and the steam through the connection 8. At 9 I have provided a removable bulkhead. At 10 I have indicated heat insulation such as asbestos or other suitable material. At 11 there is an ignition device so constructed that when the container 2 is passed into place two ignition contact points at 12 come together. A space 13 inside the housing 4 and completely surrounding the container 2 and, in fact, in its pores and throughout the entire mass of heat producer, may be filled with vacuum or nitrogen or other gas or gases used for insulating the heat from the housing 4 and the door 6. At 14 I have provided an internal or an external connection by means of which the cavity 13 may be exhausted for producing the vacuum or may be filled with a gas or gases at any required pressure for the purpose of obtaining the exact amount of heat conductivity from the heat producing compound to the steam chamber 5. At 15 I have shown a pump driven by any desirable means, controlled manually or automatically for the purpose of exhausting the gases in the cavity 13 or for the purpose of inserting them. At 16 I have shown a pressure tank connected to the steam chamber 5 by the conduit 17. At 18 I have shown an accumulation of salt in cases where sea-water is used instead of fresh water, for generating steam. 19 is a reduction valve which reduces the steam pressure to any desirable usable pressure. 20 is a nozzle which feeds steam to a turbine 21 or to any other desired form of motor or jet for the purpose of obtaining power or propulsion. 22 is the propeller shaft. 23 is an adjustable pump or pumps calibrated to pump a given quantity of water per revolution of the shaft 22, connected eccentrically to the shaft 22 for the purpose of pumping water. In the present illustration it obtains the water from the outside. 24 is a stored supply of compressed air or other desirable fluid for the purpose of starting the motor or the turbine 21 by means of the jet 25. Any other desired form of self-starting device may be substituted or left out. At 26 I have provided a torpedo latch which when it is tripped in the ordinary manner as the torpedo passes through the tube opens the valve 27 turning compressed gas through the jet 25 which rotates the motor 20 which runs the pumps 23 which pumps water by means of the jets 28 into the steam chamber 5. When the valve 27 opens, electric contacts at 29 close a circuit which ignites the heat producing compound at the ignition apparatus 11. The ignition apparatus starts the heat reaction, heat from which dissipates across the heat insulated area in the space 13, imparts heat to the water in the cavity 5 and creates steam pressure in the pressure tank or retainer 16. The steam under pressure passes through the tube 30 to the reduction valve 19 where it is reduced to working pressure, passes through the nozzle 20 to the turbine 21 by which means the turbine is kept running after the starting means 24 has ceased to exercise its force. The pressure in the tank 16 and in the tube 30 are approximately the same. When the pressure in the tank 16 is below a predetermined point the conductivity of the cavity 13 is too small and sufficient heat units are not passing across to the steam chamber. I correct that when due, e. g., to gradual leakage, at high temperatures, of gases originally forced in through 14 by means of a tube 31 and a valve 32. When the pressure is too low it permits an automatic pressure valve to open permitting nitrogen, air, steam or other gas or gases to pass from the pressure tank 33 or the tube 31 as the case may be, into the cavity 13. The increased pressure of the gas or gases permits more calories of heat to cross from the heat compound to the steam chamber and hence generate more steam thereby increasing the pressure in the tank 16 to such point that it shuts off the valve at 32, thus keeping the steam pressure in the tank 16 above a predetermined minimum.

At 34 I have provided a safety valve which maintains the pressure in the tank 16 at a predetermined maximum. When the pressure goes above that point, it is automatically exhausted through the valve 13 and out through the safety port at 35.

At 36 I have shown a one-way valve permitting pressure to pass upward only from the tank 16. At 37 I have shown a series of holes or jets or screen or other device which prohibits the passage of flame. At 38 I have provided a Venturi tube, through which the steam passes, provided with an electric spark furnished by a battery. The spark may be continuous or intermittent. The purpose of this spark is to ignite disassociated oxygen and hydrogen should they be disassociated in sufficient quantities to be ignitable. When water is subjected to high temperatures it passes into disassociated gases instead of into steam which gases absorb a large quantity of heat thereby producing low efficiency and temperatures too high for the engine. When this occurs the spark at 38 will ignite the disassociated gases after the burning of which water is produced in the form of steam at a high pressure. The screen 37 stops the flame from passing back into the tank 16 and the increased pressure in the tube 30 closes the valve 36.

Figure 2:
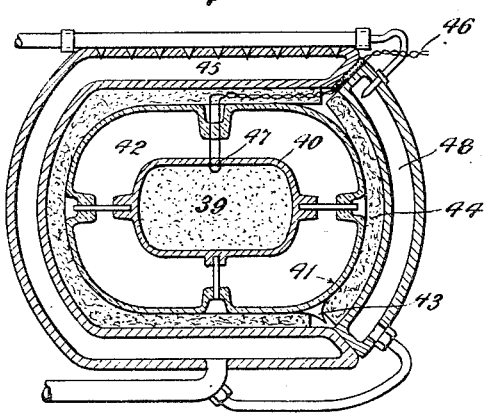
Fig. 2 is a modification of the generator.

In Fig. 2 I have shown a modification of my device in the form of a generator made of glass or other substance on the order of the incandescent lamp. Here 39 is the heat producing compound, 40 the heat resisting retainer, and 41 the glass or other jacket. The space 42 may be exhausted at high vacuum, exhaust having been made at the point 43. Or the space may be filled with nitrogen or other gas or gases preferably inert, at any desired predetermined pressure or the pressure may be varied automatically or manually by means of any suitable apparatus such as pressure tank with valve or pump or other means through an aperture connected to a pipe at 43, or other desirable point. At 44 I have shown a heat insulating or conducting material as desired for the purpose of avoiding abrasion due to vibration or jolt and for the further purpose of distributing the heat radiation evenly over the entire surface of the glass or other material in the container 41. 45 is a steam chamber in which steam is produced as in Fig. 1. At 46 I have shown an ignition connection which joins the ignition apparatus in the heat producing mixture shown at 47. The door 48 produces steam in substantially the same manner as the steam chamber 45.

Generators of the type I have described can be used as auxiliaries to steam boilers if desired, as for instance for getting up a head of steam quickly on a war vessel, and for innumerable other uses where steam or power is wanted quickly or in the most compact form.

Although I have shown but a simple and obvious method of applying my invention, numerous other constructions and arrangements of the same perhaps are evident to those versed in this art, and all could be enumerated at great length since they fall within the scope of my invention.

I claim:

1. A power generator comprising a heat producing material, a pressure chamber adapted to contain a fluid to be heated by said material, and an insulating means between the pressure chamber and said material.

2. A power generator comprising a heat producing material, a pressure chamber adapted to contain a fluid to be heated by said material, and an insulating means between the pressure chamber and said material, said means comprising a chamber.

3. A power generator comprising a heat producing material, a pressure chamber adapted to contain a fluid to be heated by said material, and an insulating means between the pressure chamber and said material, said means comprising a chamber adapted to be supplied with varying quantities of a fluid to vary the heat conduction correspondingly.

4. A power generator comprising a heat producing material, a pressure chamber adapted to contain a fluid to be heated by said material, and an insulating means between the pressure chamber and said material, said means comprising a chamber adapted to be supplied with varying quantities of a fluid to vary the heat conduction correspondingly, said chamber being provided with an automatic fluid supplying regulator to maintain a predetermined pressure in said pressure chamber.

5. A power generator comprising a heat producing material containing a combustible substance and a source of oxygen, a pressure chamber adapted to contain a fluid to be heated by said material, an insulating means between the pressure chamber and a refractory casing holding said material.

6. A power generator comprising a heat producing material containing a combustible substance and a source of oxygen, a pressure chamber adapted to contain a fluid to be heated by said material, an insulating means between the pressure chamber and a refractory casing holding said material, said means comprising a chamber.

7. A power generator comprising a heat producing material containing a combustible substance and a source of oxygen, a pressure chamber adapted to contain a fluid to be heated by said material, an insulating means between the pressure chamber and a refractory casing holding said material, said means comprising a character adapted to be supplied with varying quantities of a fluid to vary the heat conduction correspondingly.

8. A power generator comprising a heat producing material containing a combustible substance and a source of oxygen, a pressure chamber adapted to contain a fluid to be heated by said material, an insulating means between the pressure chamber and a refractory casing holding said material, said means comprising a chamber adapted to be supplied with varying quantities of a fluid to vary the heat conduction correspondingly, said chamber being provided with an automatic gas supplying regulator to maintain a predetermined pressure in said pressure chamber.

9. A power generator comprising a confined source of heat, means for supplying water to be vaporized thereby, a pressure tank connected to the source of vapor, and means associated with the pressure tank for igniting any dissociated gases.

10. A power generator comprising a confined source of heat, means for supplying water to be vaporized thereby, a pressure tank connected to the source of vapor and located beyond the same, and means associated with the pressure tank for igniting any dissociated gases.

11. A power generator comprising a confined source of heat, means for supplying water to be vaporized thereby, a pressure tank connected to the source of vapor, and means associated with the pressure tank for igniting any dissociated gases, said means comprising devices for producing an electric spark.

12. A power generator comprising a confined source of heat, means for supplying water to be vaporized thereby, a pressure tank connected to the source of vapor and located beyond the same, and means associated with the pressure tank for igniting any dissociated gases, said means comprising devices for producing an electric spark.

13. A power generator comprising a completely closed source of heat, an insulating chamber adjacent to the same, and a pressure producing chamber beyond the insulating chamber.

14. A power generator comprising a completely closed source of heat, an insulating chamber adjacent to the same, and a pressure producing chamber beyond the insulating chamber, the source of heat being inclosed by the insulating chamber, and the insulating chamber being inclosed by the pressure producing chamber.

15. A power generator comprising a completely closed source of heat, an insulating chamber adjacent to the same, a pressure producing chamber beyond the insulating chamber, the source of heat being inclosed by the insulating chamber, the insulating chamber being inclosed by the pressure producing chamber, and doors for entering the source of heat and insulating chamber.

16. A power generator comprising a completely closed source of heat, an insulating chamber adjacent to the same, a pressure producing chamber beyond the insulating chamber, an igniting means extending into the source of heat, a fluid supplying means extending into the insulating chamber, and a fluid supplying means extending into the pressure producing chamber.

17. A power generator comprising a completely closed source of heat, an insulating chamber adjacent to the same, a pressure producing chamber beyond the insulating chamber, the source of heat being inclosed by the insulating chamber, the insulating chamber being inclosed by the pressure producing chamber, an igniting means extending into the source of heat, a fluid supplying means extending into the insulating chamber, and a fluid supplying means extending into the pressure producing chamber.

18. A power generator comprising a completely closed source of heat, an insulating chamber adjacent to the same, a pressure producing chamber beyond the insulating chamber, the source of heat being inclosed by the insulating chamber, the insulating chamber being inclosed by the pressure producing chamber, doors for entering the source of heat and insulating chamber, an igniting means extending into the source of heat, a fluid supplying means extending into the insulating chamber, and a fluid supplying means extending into the pressure producing chamber.

In testimony whereof I hereunto affix my signature in the presence of two witnesses.

WARD G. LEATHERS.

Witnesses:
 FRED BLAEWELT,
 M. J. CONWAY.